(No Model.)

I. A. DODGE.
Hedge Trimmer.

No. 233,485.  Patented Oct. 19, 1880.

Attest:
Sidney P. Hollingsworth,
Nathan C. Lane.

Inventor:
I. A. Dodge,
By Dodge & Son,
Attys.

UNITED STATES PATENT OFFICE.

ISRAEL A. DODGE, OF APPLETON CITY, MISSOURI.

HEDGE-TRIMMER.

SPECIFICATION forming part of Letters Patent No. 233,485, dated October 19, 1880.

Application filed July 14, 1880. (No model.)

*To all whom it may concern:*

Be it known that I, ISRAEL A. DODGE, of Appleton City, in the county of St. Clair and State of Missouri, have invented certain Improvements in Hedge-Trimmers, of which the following is a specification.

My invention relates to apparatus for trimming hedges; and it consists in a portable frame to be carried on a wagon or otherwise, provided with a side roller to bend the tops of the plants downward and with a fixed oblique blade to act against and sever the plants while they are in a bent position.

The essential feature of the invention is the arrangement of the roller and blade in such relation to each other that they will operate as stated, and the details of construction and arrangement may be varied to any desired extent provided the roller and blade are retained.

The drawings represent my apparatus in a cheap and simple form, adapted particularly for the use of farmers.

Figure 1:
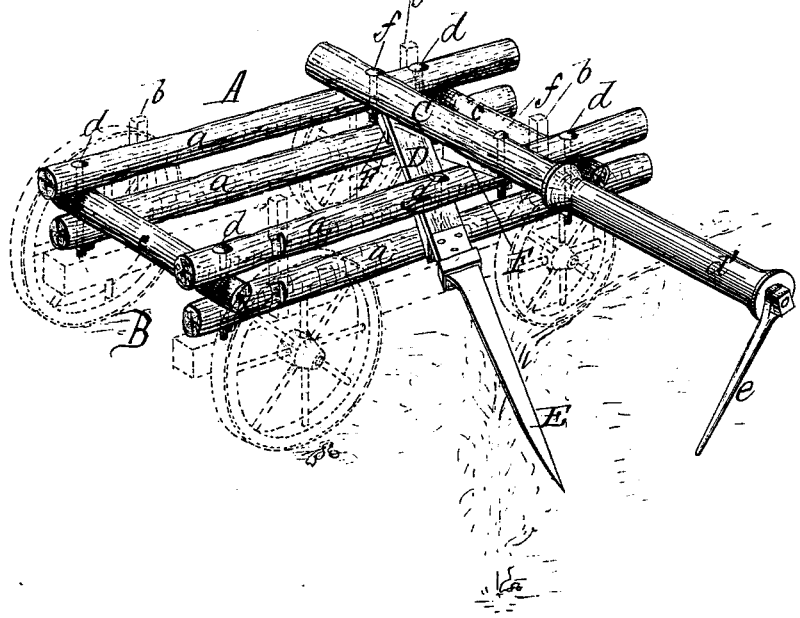
Figure 2:
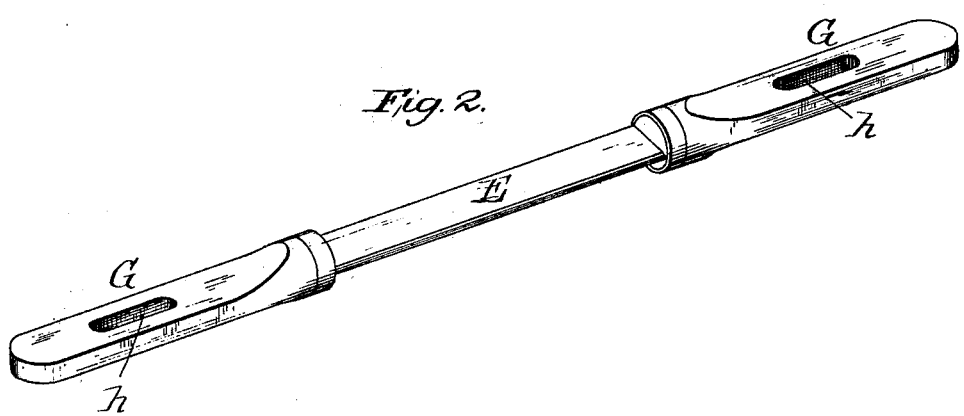

Figure 1 represents a perspective view of the apparatus in position upon a wagon, the latter being represented in dotted lines. Fig. 2 represents the cutting-blade in a modified form.

To produce a machine which, while performing its work rapidly and efficiently, shall at the same time be so cheap and simple as to come within the reach of every farmer, is the object of this invention; and to this end the invention consists in constructing a rectangular frame of proper size to fit upon an ordinary farm-wagon from which the body is removed, the frame being notched to receive the wagon-standards, providing said frame with an overhanging arm, preferably furnished with a loose sleeve or roller to bend down the plants, and mounting in said frame, below and in rear of the overhanging arm, an oblique cutting-blade, which, by reason of its obliquity, acts with a draw-cut upon the plants bent over and held down by the arm.

Referring now to the drawings, A represents the frame of my apparatus, composed of side bars or timbers, $a$, notched to receive the standards $b$ of the wagon B, upon which the frame is mounted, and end or cross timbers, $c$, separating the timbers $a$ at each side, as shown. The timbers $a$ and $c$ are secured at the corners or points of crossing by vertical bolts $d$, and may, if desired, be braced and stayed in any suitable manner.

C represents a beam or timber bolted upon and extending transversely across the top of frame A and outward over the side of the same, as shown, forming an overhanging arm, which serves to bend over and hold down the tops of the plants as the wagon is drawn forward with the arm reaching over the hedge. The overhanging arm or beam C is preferably furnished with a loose sleeve or roller, $d'$, which facilitates the passage of the arm over the plants and lessens the danger of injuring them.

D represents a second transverse beam or timber, extending across frame A and passing between the longitudinal side beams, $a\ a$, at each side. The beam D extends outward slightly past the side of frame A on the same side with the overhanging arm, and is inclined backward, as shown.

Secured to the outer end of the beam D is a horizontal blade, E, extending outward in the same oblique direction, and consequently acting upon the plants in moving forward with a draw-cut, the inner end or heel of the blade coming first against the plant, and the blade then drawing across the same to the point or until the plant is severed.

In order that the plants may not slip off at the end of the blade E without being cut, the overhanging arm C is furnished with a downwardly and backwardly extending arm or guard, $e$, which holds the plants up against the blade.

In order that the overhanging arm C and the cutting-blade E may be adjusted to operate at different elevations or on different kinds of hedge, I provide for each one or more wedge-blocks F, slotted to pass the bolts $f$ and $g$, by which the overhanging arm or beam C and the beam D are respectively secured to the frame, the longitudinal movement of the wedges serving to elevate or depress the beams, as desired. For the overhanging arm one wedge-block is usually found sufficient; but for the knife-beam I prefer to employ a block at each side of the frame, and to produce a variety of adjustments. One of said blocks may be placed above the beam and the other below, both above or both below; or the beam may be withdrawn from between the timbers of the frame A and placed below the same, the wedges being again used to vary the further adjustments of the blade.

The above described apparatus can be used in places where the presence of a ditch or other cause prevents the wagon from traveling at will on either side, and is for general purposes considered the best form in which it can be made; but in the case of very heavy hedges, and where the ground permits, a wagon may be made to travel on each side of the hedge, a blade extending obliquely across the hedge from one to the other. In such case I employ a blade or knife, such as represented in Fig. 2, each end being furnished with a handle or head, G, provided with an elongated slot, h, through which pass the bolts by which the knife is secured or attached to the frames A of the respective wagons. The obliquity of the knife under this arrangement may be produced by driving one team slightly in advance of the other, the slotted heads G permitting a considerable variation in the relative positions of the two wagons without injury to the apparatus.

The frame may be constructed of newly-felled logs or timbers of any kind possessing the requisite strength, but will commonly be made of such timbers as may be procured about a farm, thus avoiding the expense of sawed lumber.

It is apparent that the wedge-blocks may be applied to the beam C, or the knife-beam D, either, alone, and that other equivalent devices may be employed for effecting the adjustment, such, for instance, as screws or cams.

I am aware that in a hedge-trimming machine a roller to bend down the plants has been combined with a pair of vertically-vibrating blades behind the same. By making use of a fixed blade and arranging the same obliquely behind the roll in the peculiar relation shown and described, I produce a machine which is far cheaper and more simple in action, and which, unlike the machine named, will trim the top of the hedge to a true and level surface.

Having described my invention, what I claim, is—

1. The herein-described hedge-trimmer consisting of a supporting-frame, a horizontal arm or roller extending therefrom, and a horizontal blade fixed rigidly in place below and behind the roller.

2. The combination, in a hedge-trimmer, of a supporting-frame, a fixed arm or roll overhanging its side, a backwardly-extending guard at the outer end of the roll, and a fixed blade, E, located behind the roll, as shown.

3. The combination, in a hedge-trimmer, of the main frame, the roller and its vertical adjusting devices, and the blade and its adjusting devices, substantially as described.

ISRAEL A. DODGE.

Witnesses:
JOHN A. GILBREATH,
A. E. ROSS.